R. F. WOLCOTT.
Balance Scales.

No. 14,702.

Patented April 15, 1856.

250
UNITED STATES PATENT OFFICE.

R. F. WOLCOTT, OF CLAREMONT, NEW HAMPSHIRE.

WEIGHING-SCALE.

Specification of Letters Patent No. 14,702, dated April 15, 1856.

*To all whom it may concern:*

Figure 1:
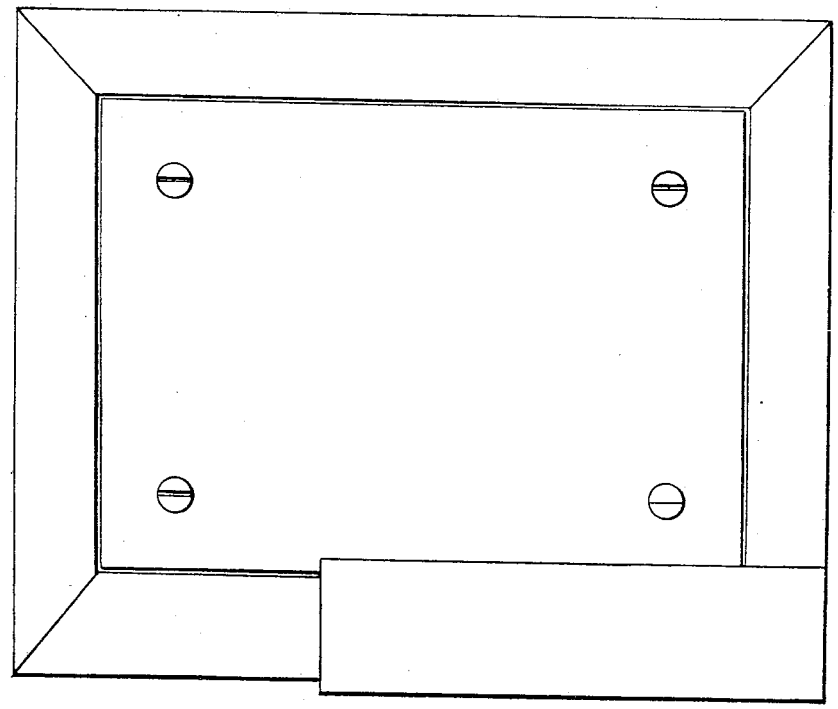
Figure 2:
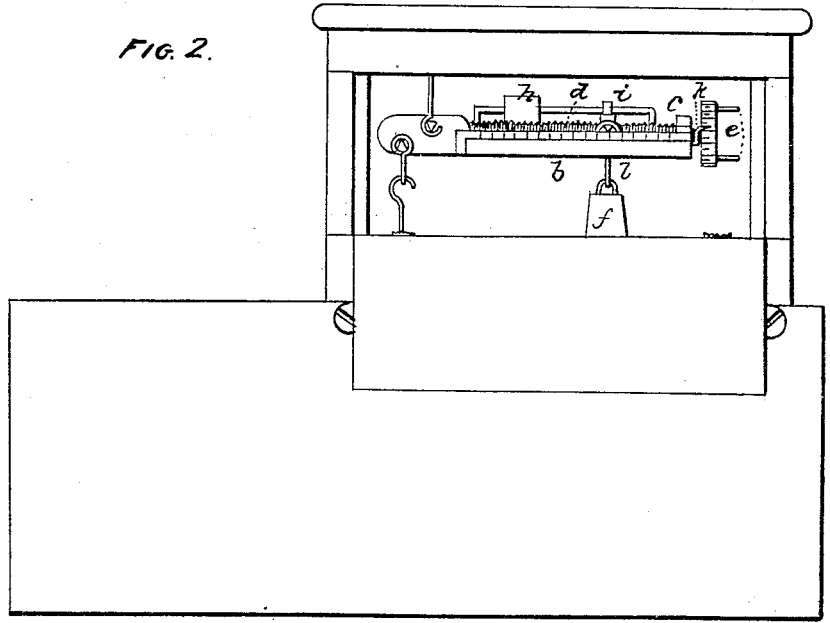

Be it known that I, R. F. WOLCOTT, of Claremont, in the county of Sullivan and State of New Hampshire, have invented a new and useful Improvement in Weighing-Scales; and I do hereby declare that the following is a full and exact description thereof, reference being had to the accompanying drawings, making a part of this specification, Figure 1, being a top view of a platform scale; Fig. 2, a side view of the same with the door of the beam box open; Fig. 3, a top view of the scale beam detached, and Fig. 4 a longitudinal vertical section in the line $y\ y$ of Fig. 3.

Similar letters indicate like parts in all the figures.

My improvement in weighing scales, consists in an arrangement by which the poise can be lifted from one position to another upon the scale beam, or be moved in either direction by turning a regulating screw $d$, which forms a part of said scale beam.

My compound scale beam is composed of the head $a$, the sides $b$, $b$, the outer end $c$, and the regulating screw $d$, which may be combined with each other substantially as represented in the drawings.

The weighing poise is composed of the saddle $i$, and the hanging weight $f$; the screw cavity in said saddle, resting upon the regulating screw $d$, the legs of said saddle, resting upon the side bars $b$, $b$, of the beam, and the weight $f$, being suspended to said saddle legs through the medium of the double hook $l$. The front leg of the saddle $i$, is the index of the weighing poise.

By taking hold of the handle of the saddle $i$, the poise may be lifted and moved from one portion of the scale beam to another; or the poise may be moved in either direction by turning the regulating screw $d$. The respective portions of the scale beam may be so proportioned and adjusted that one revolution of the regulating screw, will move the weighing poise the distance of one of the spaces on said beam; and the spaces on the periphery of the circular handle $e$, of the regulating screw $d$, may be so proportioned as to indicate fractions of the difference of weight between the outlines of each space on the front bar of the scale beam.

When the weighing poise is lifted from one place to another on the scale beam, care should be taken to see that its index points to one of the division lines on the front bar of the scale beam at the same time that the index $h$, points to the division mark indicating 0, of the scale on the periphery of the circular handle $e$, of the regulating screw.

A balancing poise $h$, may be combined with my improved scale beam in the manner represented in the drawings, or in any other manner that may be preferred by the manufacturer.

I do not claim as my invention the principle of operating a scale-poise by means of a screw, but What I do claim and desire to secure by Letters Patent, is the arrangement of the compound weighing-poise with the screw $d$, and with the sides of the scale beam, in such a manner that the said poise may be either lifted from place to place upon the beam, or be moved, gradually thereupon by turning the said screw $d$, substantially as herein set forth.

The above specification of my new and useful improvement in scales, signed and witnessed this 30th day of November A. D. 1855.

R. F. WOLCOTT.

Witnesses:
CHAS. E. KILBY,
G. D. ROLLINS.